(12) United States Patent
Thienphrapa

(10) Patent No.: US 11,383,792 B1
(45) Date of Patent: Jul. 12, 2022

(54) MOTORIZED CYCLE

(71) Applicant: John Suratana Thienphrapa, Los Angeles, CA (US)

(72) Inventor: John Suratana Thienphrapa, Los Angeles, CA (US)

(*) Notice: Subject to any disclaimer, the term of this patent is extended or adjusted under 35 U.S.C. 154(b) by 0 days.

(21) Appl. No.: 17/459,824

(22) Filed: Aug. 27, 2021

(51) Int. Cl.
*B62M 7/12* (2006.01)
*B62K 15/00* (2006.01)
*B62K 25/04* (2006.01)

(52) U.S. Cl.
CPC ............. *B62M 7/12* (2013.01); *B62K 15/006* (2013.01); *B62K 25/04* (2013.01); *B62K 2015/001* (2013.01); *B62K 2201/00* (2013.01)

(58) Field of Classification Search
CPC ........ B62M 7/12; B62K 15/006; B62K 25/04; B62K 2015/001
See application file for complete search history.

(56) References Cited

U.S. PATENT DOCUMENTS

| | | |
|---|---|---|
| 1,120,427 A | 12/1914 | Webster |
| 2,861,815 A | 11/1958 | Willinger |
| 2,965,186 A | 12/1960 | Burns, Jr. |
| 3,004,619 A | 10/1961 | Straussler |
| 3,417,834 A | 12/1968 | Smith |
| 3,776,353 A | 12/1973 | Roth |
| 4,392,536 A | 7/1983 | Iwai |
| 4,437,535 A | 3/1984 | Winchell |
| 4,460,057 A | 7/1984 | Kohyama |
| RE32,031 E | 11/1985 | Winchell |
| 4,558,878 A | 12/1985 | Motrenec |
| 5,425,567 A | 6/1995 | Albecker, III |
| 5,611,555 A | 3/1997 | Vidal |
| 6,021,862 A | 2/2000 | Sharan |
| 6,345,678 B1 | 2/2002 | Chang |
| 7,100,727 B2 | 9/2006 | Patin |
| 7,419,024 B1 | 9/2008 | Tavantzis |
| 7,600,596 B2 | 10/2009 | Van Den Brink |
| 8,056,658 B2 | 11/2011 | Horii |
| 8,177,012 B2 | 5/2012 | Horii |
| 8,249,775 B2 | 8/2012 | Van Den Brink |
| 8,531,072 B2 | 9/2013 | Wishart |
| 8,641,064 B2 | 2/2014 | Krajekian |
| 8,862,296 B2 | 10/2014 | Kurakawa |
| 8,915,323 B2 | 12/2014 | Tsujii |
| 9,731,785 B1 | 8/2017 | Liu |

(Continued)

*Primary Examiner* — Tony H Winner
(74) *Attorney, Agent, or Firm* — Quickpatents, LLC; Kevin Prince

(57) ABSTRACT

A vehicle for a person to ride on a ground surface includes a rigid frame that has front and rear ends and at least a seat on a top side of the frame. A steering mechanism disposed proximate the front end of the frame is adapted for allowing the person to steer a front wheel. A steering fork may include two lower fork members each selectively detachable from two upper fork members of the steering fork at two telescoping attachment arrangements that includes a front suspension arrangement. A rigid frame extension has a front end that is pivotally fixed proximate the rear end of the frame. The frame extension includes at least one rear wheel fixed with a rear end of the frame extension. A motor is fixed with the front wheel and is electrically connected with at least one battery and a throttle switch fixed with the steering mechanism.

13 Claims, 6 Drawing Sheets

(56) References Cited

U.S. PATENT DOCUMENTS

| | | |
|---|---|---|
| 9,764,657 B2 | 9/2017 | Harding |
| 9,862,448 B2 | 1/2018 | Hirakawa |
| 10,262,583 B2 | 4/2019 | Kim et al. |
| 10,800,476 B1 * | 10/2020 | Thienphrapa ........... B62K 23/04 |
| 11,043,861 B2 * | 6/2021 | Hua ........................ H02K 7/006 |
| 2004/0035628 A1 | 2/2004 | Takayanagi |
| 2004/0129472 A1 | 7/2004 | Cheng |
| 2005/0151345 A1 | 7/2005 | Chen |
| 2006/0249322 A1 | 11/2006 | Maki |
| 2007/0051548 A1 * | 3/2007 | Kosco .................. B62K 15/006 |
| | | 180/208 |
| 2008/0115994 A1 | 5/2008 | Martini |
| 2008/0135319 A1 | 6/2008 | Lynn |
| 2008/0296855 A1 | 12/2008 | Roseman |
| 2010/0292041 A1 | 11/2010 | Matthies |
| 2012/0013103 A1 | 1/2012 | Marion |
| 2012/0175856 A1 | 7/2012 | Ellis |
| 2013/0062863 A1 | 3/2013 | Moldestad |
| 2013/0153311 A1 | 6/2013 | Huntzinger |
| 2013/0288841 A1 | 10/2013 | Yoshino |
| 2013/0304319 A1 | 11/2013 | Daniels |
| 2014/0076649 A1 * | 3/2014 | Kim ........................ B62M 6/40 |
| | | 180/220 |
| 2014/0077476 A1 | 3/2014 | Kosco |
| 2015/0021985 A1 | 1/2015 | Matsuda |
| 2016/0096574 A1 | 4/2016 | Liu |
| 2016/0221629 A1 | 8/2016 | Behar |
| 2016/0229474 A1 * | 8/2016 | Carlson ..................... B62J 9/23 |
| 2016/0304159 A1 * | 10/2016 | Huang ..................... B62M 7/12 |
| 2016/0355229 A1 | 12/2016 | Chen |
| 2017/0021889 A1 | 1/2017 | Frohnmayer |
| 2017/0050693 A1 | 2/2017 | Matties |
| 2017/0101145 A1 | 4/2017 | Martinez |
| 2017/0158277 A1 | 6/2017 | Hsu |
| 2017/0247075 A1 | 8/2017 | Kano |
| 2018/0208264 A1 * | 7/2018 | Tan ........................ B62K 3/002 |
| 2019/0248439 A1 * | 8/2019 | Wang ................... B60L 53/305 |

* cited by examiner

MOTORIZED CYCLE

STATEMENT REGARDING FEDERALLY SPONSORED RESEARCH AND DEVELOPMENT

Not Applicable.

FIELD OF THE INVENTION

This invention relates to vehicles, and more particularly to a motorized cycle having two or three wheels.

DISCUSSION OF RELATED ART

Motorcycles and scooters (herein just "scooters") are preferred by some people over automobiles due to their superior maneuverability and generally lower cost. However, such scooters are still sometimes difficult to transport and store, and thus there is a need for a scooter that can retract into a more compact, collapsed position. Automobiles generally have more cargo space than scooters, and thus there is also a need for a scooter having more room for cargo such as shopping bags, and the like. Further, such a needed vehicle would be comfortable to ride and easy to use. The present invention accomplishes these objectives.

SUMMARY OF THE INVENTION

The present device is a vehicle for a person to ride on a ground surface. The vehicle includes a rigid frame that has a front end and a rear end. The frame supports at least a seat on a top side of the frame proximate the rear end of the frame. The seat preferably includes a seat cushion and a seat frame, with a storage space under the seat cushion for allowing the storing of a helmet, shopping bag, or the like. The rear end of the frame may extend telescopically rearwardly with a frame extender to hold an additional storage crate, or the like.

A steering mechanism is disposed proximate the front end of the frame. The steering mechanism is adapted for allowing the person to steer a front wheel that is rotationally fixed to the frame. Such a steering mechanism may include rigid handlebars fixed with a rigid steering fork that straddles the front wheel through a steering headstock fixed with the front end of the frame. Preferably the steering mechanism further includes hand grips at opposing ends of the handlebars.

A rigid frame extension has a front end that is pivotally fixed proximate the rear end of the frame. The frame extension includes at least one rear wheel fixed with a rear end of the frame extension. A motor is fixed with the front wheel and is electrically connected with at least one battery and a throttle switch fixed with the steering mechanism.

To inhibit theft of the vehicle, an on/off switch with a key lock is preferably included to electrically activate the motor only if a key is inserted into the key lock of the on/off switch. A throttle switch is fixed with the steering mechanism, and preferably the handlebars proximate one of the hand grips, and is used by the person to control the speed of the motor and thereby the speed of the vehicle. Preferably the frame extension is generally U-shaped or H-shaped and includes two opposing ends, each end being fixed to the frame with one of two pivots.

In use, the frame extension and the at least one rear wheel are pivoted forward to place the vehicle in a collapsed configuration for storage or to facilitate transport of the vehicle, for example. To use the vehicle, the frame extension is pivoted backward to place the vehicle in an operating configuration.

Preferably the frame includes a rear cross member adapted to contact the extension frame at an extension frame cross member via a resilient suspension member when the vehicle is in the operating configuration. The resilient suspension member is preferably at least one spring shock absorber or at least one elastomeric cushion fixed between the rear cross member and the extension frame cross member for cushioning the frame from impacts to the rear wheels, for example.

The vehicle preferably further includes a front brake mechanism fixed between the front wheel and the steering fork, the front brake mechanism preferably further including a front actuator cable extending upward from the front brake mechanism along the steering fork, to the handlebars, and to one of the hand grips to a front brake actuator lever. Similarly, a rear brake mechanism may be included, as is known in the art.

The steering fork may include two lower fork members each selectively detachable from two upper fork members of the steering fork at two telescoping attachment arrangements. Each of the telescoping attachment arrangements includes a slot in the lower fork member adapted to slidably receive a bolt fixed through each upper fork member of the steering fork. The telescoping attachment arrangement provides for the lower fork members of the steering fork to move between a raised position and a lowered position, defined by a length of the slot and the relative position of the bolt to the slot.

The telescoping attachment arrangement may further include a front suspension arrangement comprising spring retainer plates on the upper fork member and another of the spring retainer plates on the lower fork member. A compression spring is fixed between each of the spring retainer plate of the upper fork member and the spring retainer plate of the lower fork member. The attachment arrangements thereby cushion the impact of the ground surface with the upper fork members and the steering fork.

The present device provides for a collapsed configuration for facilitating storage and transport of the vehicle, and is comfortable to ride and easy to use. Further, the present device offers an extended cargo area. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
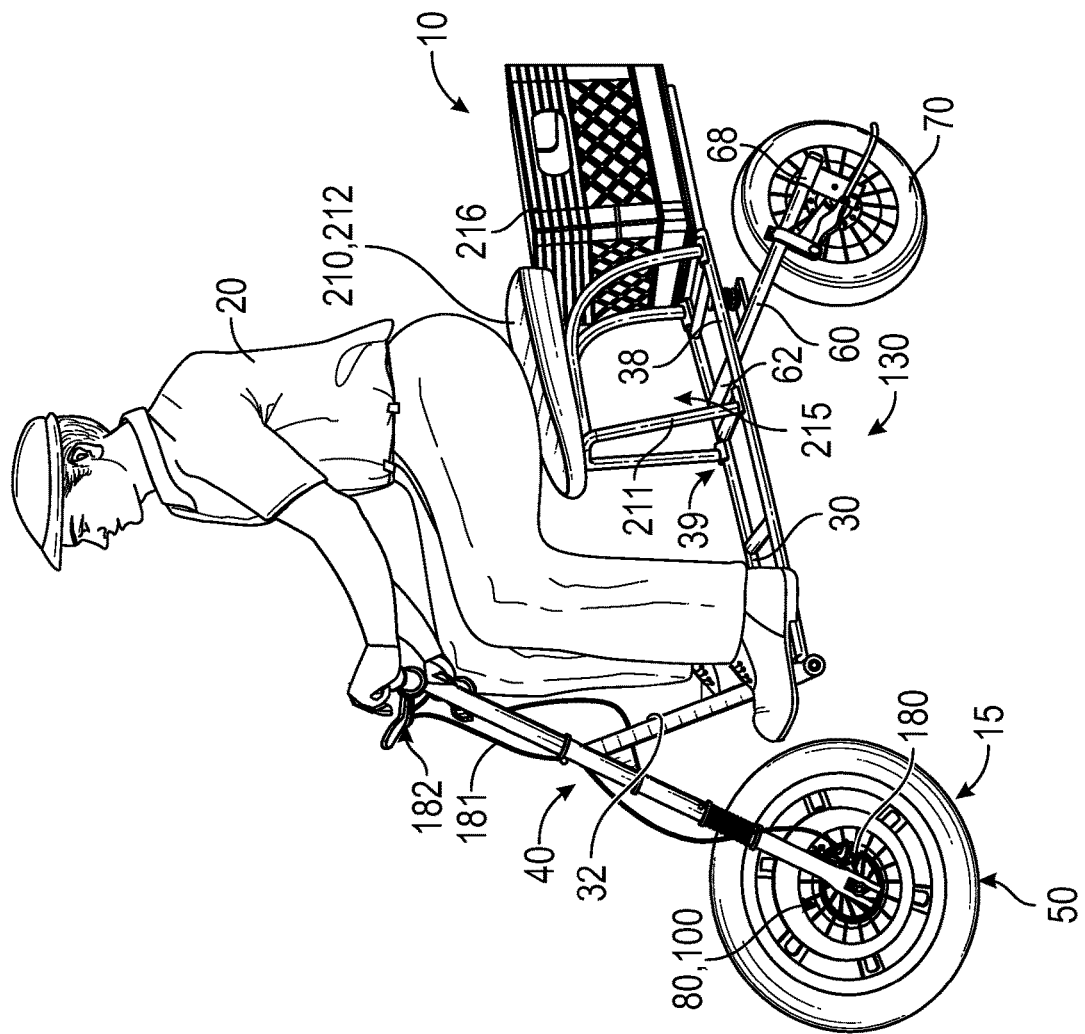
FIG. 1 is a perspective view of the invention, illustrated as in-use by a person riding on a ground surface.
Figure 2:
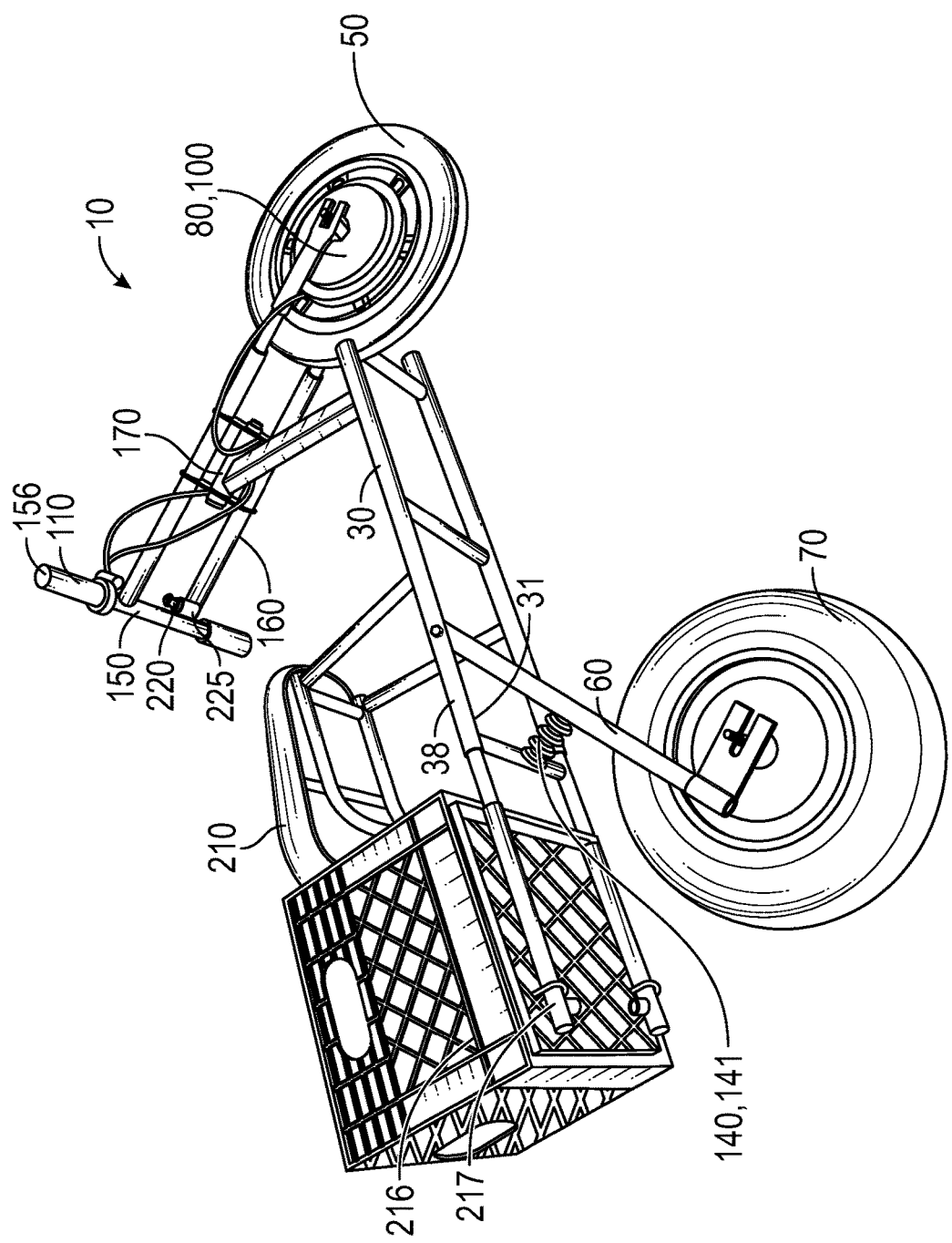
FIG. 2 is a perspective view of the invention, illustrated in an operating configuration.
Figure 3:
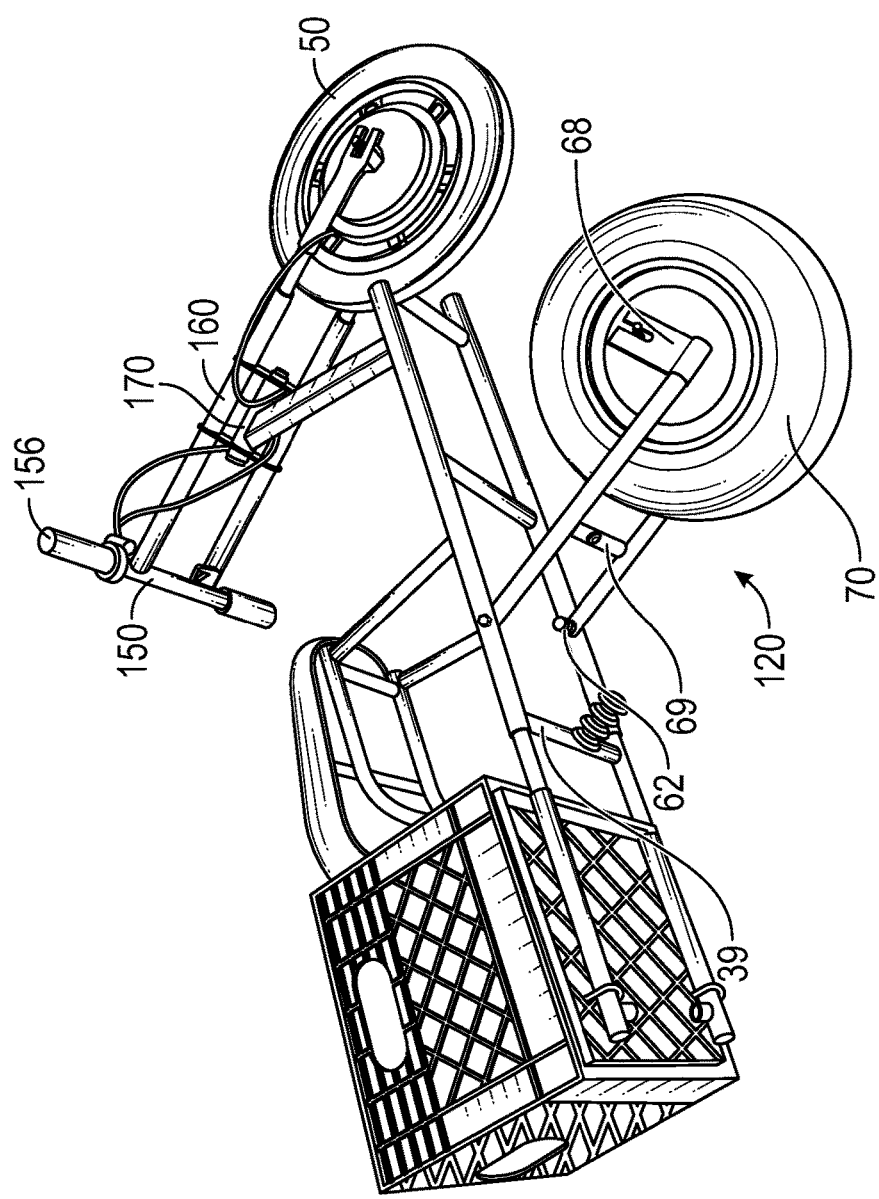
FIG. 3 is a perspective view of the invention, illustrated in a collapsed configuration.
Figure 4A:
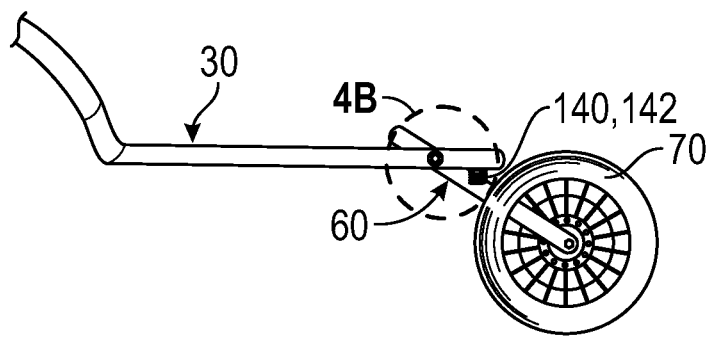
FIG. 4A is a partial side elevational diagram of the invention.
Figure 4B:
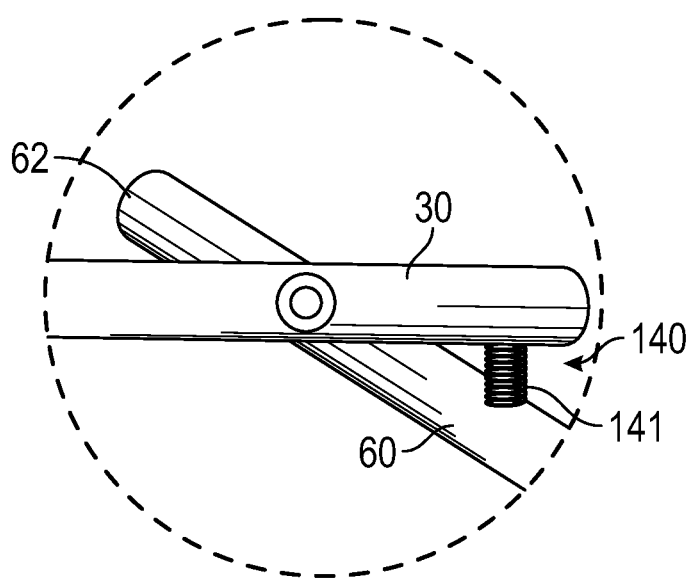
FIG. 4B is an enlarged side elevational diagram of the invention, taken along line 4B-4B of FIG. 4A.

FIGS. 1-3 illustrate a vehicle 10 for a person 20 to ride on a ground surface 15. The vehicle 10 includes a rigid frame 30 that has a front end 32 and a rear end 38. The frame 30 supports at least a seat 210 on a top side 39 of the frame 30 proximate the rear end 38 of the frame 30. The seat 210 preferably includes a seat cushion 212 and a seat frame 211, with a storage space 215 under the seat cushion 212 for allowing the storing of a helmet (not shown), shopping bag (not shown), or the like. The rear end 38 of the frame 30 may extend telescopically rearwardly with a frame extender 217 to hold an additional storage crate 216, or the like.

A steering mechanism 40 (FIGS. 1, 5-6) is disposed proximate the front end 32 of the frame 30. The steering mechanism 40 is adapted for allowing the person 20 to steer a front wheel 50 that is rotationally fixed to the frame 30. Such a steering mechanism 40 may include rigid handlebars 150 fixed with a rigid steering fork 160 that straddles the front wheel 50 through a steering headstock 170 fixed with the front end 32 of the frame 30. Preferably the steering mechanism 40 further includes hand grips 156 at opposing ends 155 of the handlebars 150.

A rigid frame extension 60 has a front end 62 that is pivotally fixed proximate the rear end 38 of the frame 30. The frame extension 60 includes at least one rear wheel 70 fixed with a rear end 68 of the frame extension 60.

A motor 80 is fixed with the front wheel 50 and is electrically connected with at least one battery 100 and a throttle switch 110 fixed with the steering mechanism 40. Such a battery 100 is preferably rechargeable as is known in the art. The motor 80 is also known in the art, and is referred to commonly as a hub motor 80.

To inhibit theft of the vehicle 10, an on/off switch 220 with a key lock is preferably included to electrically activate the motor 80 only if a key 225 is inserted into the key lock of the on/off switch 220. A throttle switch 110 is fixed with the steering mechanism 40, and preferably the handlebars 150 proximate one of the hand grips 156, and is used by the person 20 to control the speed of the motor 80 and thereby the speed of the vehicle 10. Preferably the frame extension 60 is generally U-shaped and includes two opposing ends 65, each end 65 being fixed to the frame 30 with one of two pivots 200 (FIGS. 5 and 6).

In use, the frame extension 60 and the at least one rear wheel 70 are pivoted forward to place the vehicle 10 in a collapsed configuration 120 (FIG. 3) for storage or to facilitate transport of the vehicle 10, for example. To use the vehicle 10, the frame extension 60 is pivoted backward to place the vehicle 10 in an operating configuration 130 (FIGS. 1, 2, 4A, 4B).

Preferably the frame 30 includes a rear cross member 39 (FIG. 3) adapted to contact the extension frame 60 at an extension frame cross member 69 via a resilient suspension member 140 when the vehicle 10 is in the operating configuration 130. The resilient suspension member 140 is preferably at least one spring shock absorber 141 (FIG. 4B) or at least one elastomeric cushion 142 (FIG. 4A) fixed between the rear cross member 39 and the extension frame cross member 69 for cushioning the frame 30 from impacts to the rear wheels 70, for example.

Figure 5:
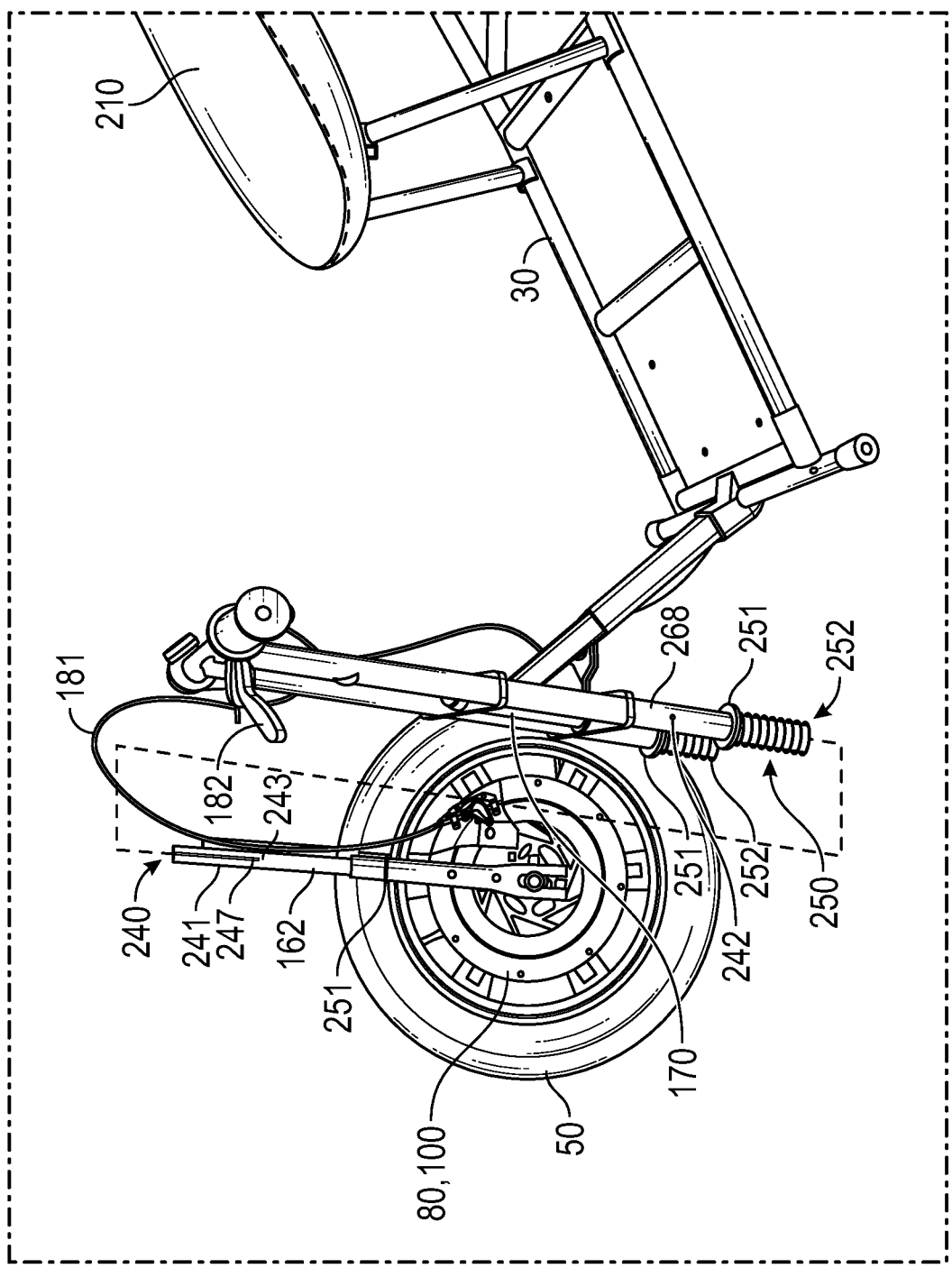
FIG. 5 is a partial side perspective view of another embodiment of the invention.
Figure 6:
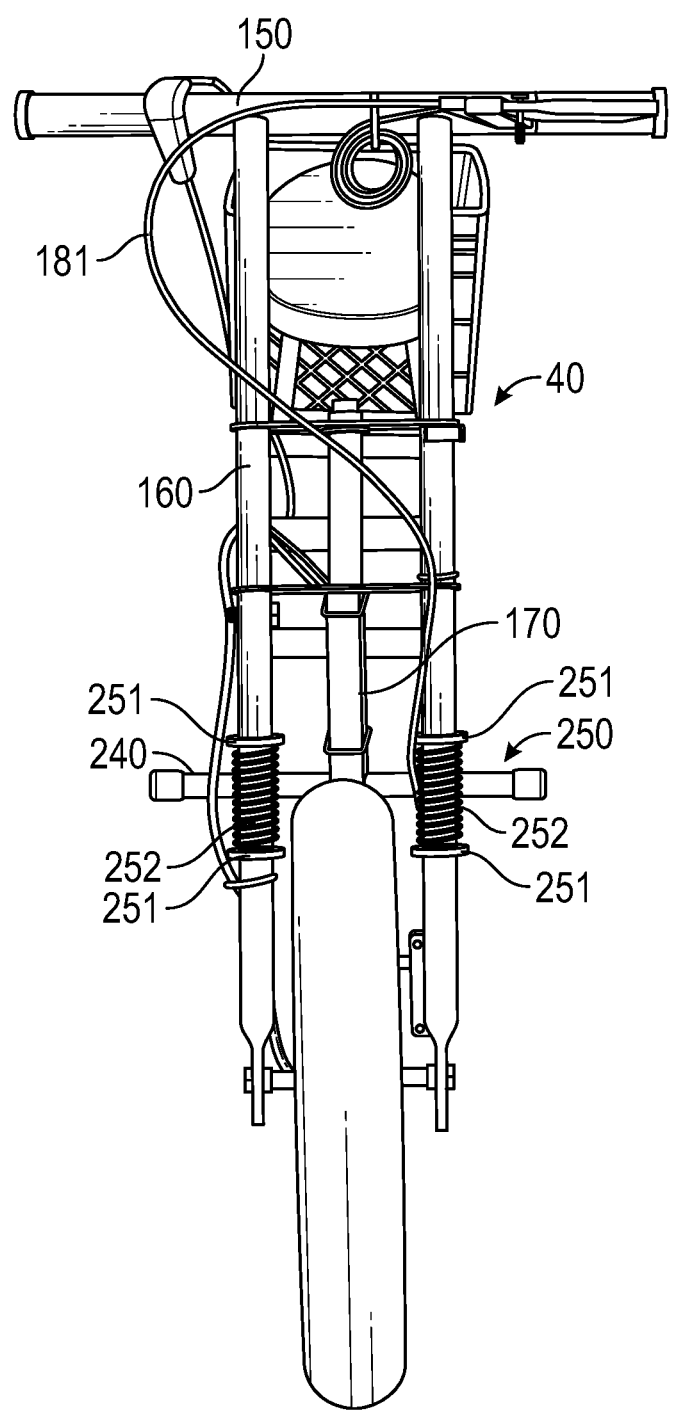
FIG. 6 is a front elevational view of the embodiment of FIG. 5.

The vehicle 10 preferably further includes a front brake mechanism 180 fixed between the front wheel 50 and the steering fork 160, the front brake mechanism preferably further including a front actuator cable 181 extending upward from the front brake mechanism 180 along the steering fork 160, to the handlebars 150, and to one of the hand grips 156 to a front brake actuator lever 182 (FIGS. 1 and 5). Similarly, a rear brake mechanism (not shown) may be included, as is known in the art.

The steering fork 160 may include two lower fork members 162 (FIGS. 5 and 6) each selectively detachable from two upper fork members 168 of the steering fork 160 at two telescoping attachment arrangements 240. Each of the telescoping attachment arrangements 240 includes a slot 241 in the lower fork member 162 adapted to slidably receive a bolt 242 fixed through each upper fork member 168 of the steering fork 160. The telescoping attachment arrangement 240 provides for the lower fork members 162 of the steering fork 160 to move between a raised position 247 and a lowered position 243, defined by a length of the slot 241 and the relative position of the bolt 242 to the slot 241.

The telescoping attachment arrangement 240 may further include a front suspension arrangement 250 comprising a spring retainer plate 251 on each of the upper fork members 268 and another of the spring retainer plates 251 on each of the lower fork member 162. A compression spring 252 is fixed between the spring retainer plate 251 of the upper fork member 268 and the spring retainer plate 151 of the lower fork member 162. The attachment arrangements thereby cushion the impact of the ground surface 15 with the upper fork members 268 and the steering fork 160.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A vehicle for a person to ride on a ground surface, comprising:
   a frame having a front end and a rear end, the frame supporting at least a seat on a top side thereof proximate the rear end of the frame, and a steering mechanism proximate the front end of the frame, the steering mechanism adapted for steering a front wheel rotationally fixed thereto;
   a front end of a frame extension pivotally fixed proximate the rear end of the frame, the frame extension further including at least one rear wheel fixed with a rear end of the frame extension;
   a motor fixed with the front wheel and electrically connected with at least one battery and a throttle switch fixed with the steering mechanism;
   the steering mechanism including handlebars fixed with a steering fork that straddles the front wheel through a steering headstock fixed with the front end of the frame, the throttle fixed on the handlebars;
   wherein two lower fork members of the steering fork are each selectively detachable from two upper fork members of the steering fork at two telescoping attachment arrangements that each includes a slot in the lower fork member adapted to slidingly receive a bolt fixed through each upper fork member of the steering fork, the telescoping attachment arrangement providing for the lower fork members of the steering fork to move between raised and lowered positions defined by a length of the slot and a relative position of the bolt to the slot;
   whereby the frame extension and the at least one rear wheel can be pivoted forward to place the vehicle in a collapsed configuration, or pivoted backward to place the vehicle in an operating configuration.

2. The vehicle of claim 1 wherein the frame includes a rear cross member adapted to contact the extension frame when the extension frame is in the operating configuration, the vehicle further including a resilient suspension member fixed between the rear cross member and the extension frame for cushioning the frame from impacts to the rear wheels.

3. The vehicle of claim 2 wherein the frame extension is generally U-shaped and includes two opposing ends, each end being fixed to the frame with one of two pivots.

4. The vehicle of claim 2 wherein the resilient suspension member is at least one spring shock absorber.

5. The vehicle of claim 2 wherein the resilient suspension member is at least one elastomeric cushion.

6. The vehicle of claim 1 wherein the frame further includes hand grips at opposing ends of the handlebars, the throttle switch incorporated within one of the hand grips.

7. The vehicle of claim 6 further including a rear brake mechanism fixed between at least one of the rear wheels and the extension frame, the rear brake mechanism including a rear actuator cable extending forward from the rear brake mechanism along the frame, to the steering headstock, to the handlebars, and then to one of the hand grips to a rear brake actuator lever, whereby actuation of the rear brake actuator level moves the rear actuator cable to actuate the rear brake mechanism to slow or stop the at least one of the rear wheels from rotating with respect to the frame extension.

8. The vehicle of claim 1 wherein the two attachment arrangements each includes a front suspension arrangement comprising a spring retainer plate on the upper fork member and another of the spring retainer plates on the lower fork member, a compression spring fixed between the spring retainer plate of the upper fork member and the spring retainer plate of the lower fork member, the attachment arrangements cushioning an impact of the ground surface to the upper fork members.

9. The vehicle of claim 1 further including a front brake mechanism fixed between the front wheel and the steering fork.

10. The vehicle of claim 1 further including a front brake mechanism fixed between the front wheel and the steering fork, the front brake mechanism including a front actuator cable extending upward from the front brake mechanism along the steering fork, to the handlebars, and to one of the hand grips to a front brake actuator lever, whereby actuation of the front brake actuator level moves the front actuator cable to actuate the front brake mechanism to slow or stop the front wheel from rotating with respect to the front steering fork.

11. The vehicle of claim 1 further including a rear brake mechanism fixed between at least one of the rear wheels and the extension frame.

12. The vehicle of claim 1 further including an on/off switch with a key lock, whereby the key lock cannot be actuated without a key being inserted therein.

13. The vehicle of claim 1 wherein the frame includes a storage space.

* * * * *